United States Patent
Hess

[11] 3,833,965
[45] Sept. 10, 1974

[54] ADJUSTABLE SEAT INCLINATION FITTING

[75] Inventor: Peter Hess, Coburg, Germany

[73] Assignee: Metallwerke Max Brose & Co., Coburg, Germany

[22] Filed: Nov. 6, 1972

[21] Appl. No.: 303,695

[30] Foreign Application Priority Data
Apr. 1, 1972  Germany...................... 7212432[U]

[52] U.S. Cl.................... 16/146, 297/362, 297/373
[51] Int. Cl......................... E05d 11/10, B60m 1/02
[58] Field of Search............ 16/139, 141, 144, 146; 297/362, 366, 367, 371, 372, 373; 74/530, 536

[56] References Cited
UNITED STATES PATENTS

| | | | |
|---|---|---|---|
| 3,343,872 | 9/1967 | Werner et al....................... | 297/362 |
| 3,432,881 | 3/1969 | Putsch et al. ....................... | 297/366 |
| 3,471,892 | 10/1969 | Resag et al. ........................... | 16/146 |
| 3,608,128 | 9/1971 | Faust................................... | 16/146 |

Primary Examiner—Casmir A. Nunberg
Attorney, Agent, or Firm—Charles W. Helzer

[57] ABSTRACT

The back rest and seat fitting members of an automotive seat are pivotally interconnected by means of a cross shaft for adjusting the inclination of the back rest; one of the fitting members is provided with a toothed segment concentric with respect to the pivotal shaft and the other of the fitting members is provided with a rotatably mounted gear wheel in meshing engagement with the toothed segment for driving a larger gear wheel that may be selectively locked against rotation by means of a detent positively cammed into locking engagement by movement of an actuating lever into a first position, with movement of the actuating lever pivotally about the pivotal axis to a second position causing withdrawal of the detent by means of a pin and slot connection between the lever and detent. The detent is guided for radial reciprocation, with respect to the pivotal axis, on the fitting member carrying the gear wheels, and the detent member further has a slot elongated in the direction of reciprocation and surrounding the pivotal shaft. Springs may be provided to bias the actuating lever into its locking position and further for biasing the back rest pivotally to its upright position. One of the gear wheels, preferably the smaller gear wheel in tooth engagement with the gear's toothed segment is integrally formed in one piece with a stub shaft splined entirely to its outer terminal end with a single spline root diameter, a first intermediate outer spline diameter portion receiving an internally splined annular bearing member, and an outermost shaft portion having an outer spline diameter less than said intermediate shaft portion outer spline diameter for receiving with a force fit the larger of the two toothed wheels that selectively meshes with the detent.

10 Claims, 3 Drawing Figures

ADJUSTABLE SEAT INCLINATION FITTING

BACKGROUND OF THE INVENTION

The present invention relates to an automotive seat that has a back rest that may be tilted to its inclination with respect to the remainder of the seat, that is the generally horizontal seat member. Usually fittings are provided on each side of the automotive seat, with each fitting having a first plate rigidly secured to the back rest, a second plate rigidly secured to the seat member, means to pivotally interconnect the plates, and means to lock the plates in various positions of inclination for the back rest.

A number of such fittings are known to adjust and lock the back rest of an automotive seat in various inclined positions. There are fittings of relatively low cost, but their operation leaves much to be desired. Further, there are a number of fittings with locking devices which are provided with a pawl mounted on one of the fitting plates to engage a toothed segment mounted on the other of the fitting plates. If a fine seat adjustment is required this toothed segment must have very fine or small pitched teeth and a large diameter, which in two door passenger cars is automatically prohibitive, because such a fitting becomes so large that it obstructs access to the back seats. It is known to provide such a fine adjustment for a fitting by means of a pawl to cooperate with a non-rotatable gear wheel connected to a gear wheel meshing with the toothed segment.

SUMMARY OF THE INVENTION

It is an object of the present invention to provide a fitting of the above type which will satisfy the requirements of present day automobile purchasers and manufacturers. With the present invention, the detent gear will positively retain the back rest of the seat against forward and backward tilting, so that even in the event of a frontal collision the back rest of the front seats will not be pushed forward by the person sitting in the back seats.

According to the present invention, there is provided a fitting to adjust the inclination of the back rest with respect to the horizontal seat member on each side of a seat, with each fitting being provided with two pivotally interconnected plates respectively rigidly mounted on the back rest and horizontal seat member, in combination with means for locking the back rest in various positions relative to the seat member. Such locking means having a toothed segment fixed with respect to one of the plates of a fitting, with the teeth of the segment extending concentrically with respect to the pivotal axis for the two plates and meshing with a gear wheel that is rotatably mounted on the other plate. A gear wheel of larger diameter is drivingly connected, and preferably rigid with the first mentioned gear wheel. A detent or catch is mounted, preferably on the plate rotatably mounting the gear wheels so as to be displaceable, preferably in a direction radial with respect to the common pivotal axis of the plates, into and out of tooth engagement with the larger gear wheel to selectively lock the gear wheels against rotation. Preferably the detent has a slot, elongated in the radial direction, to receive therein the pivot shaft and is further provided with a follower cam to engage a driving cam secured to an actuating lever.

BRIEF DESCRIPTION OF THE DRAWING

Further objects, features and advantages of the present invention will become more clear from the following detailed description of the present invention as shown in the drawing, in which.

DETAILED DESCRIPTION OF THE INVENTION

Figure 1:
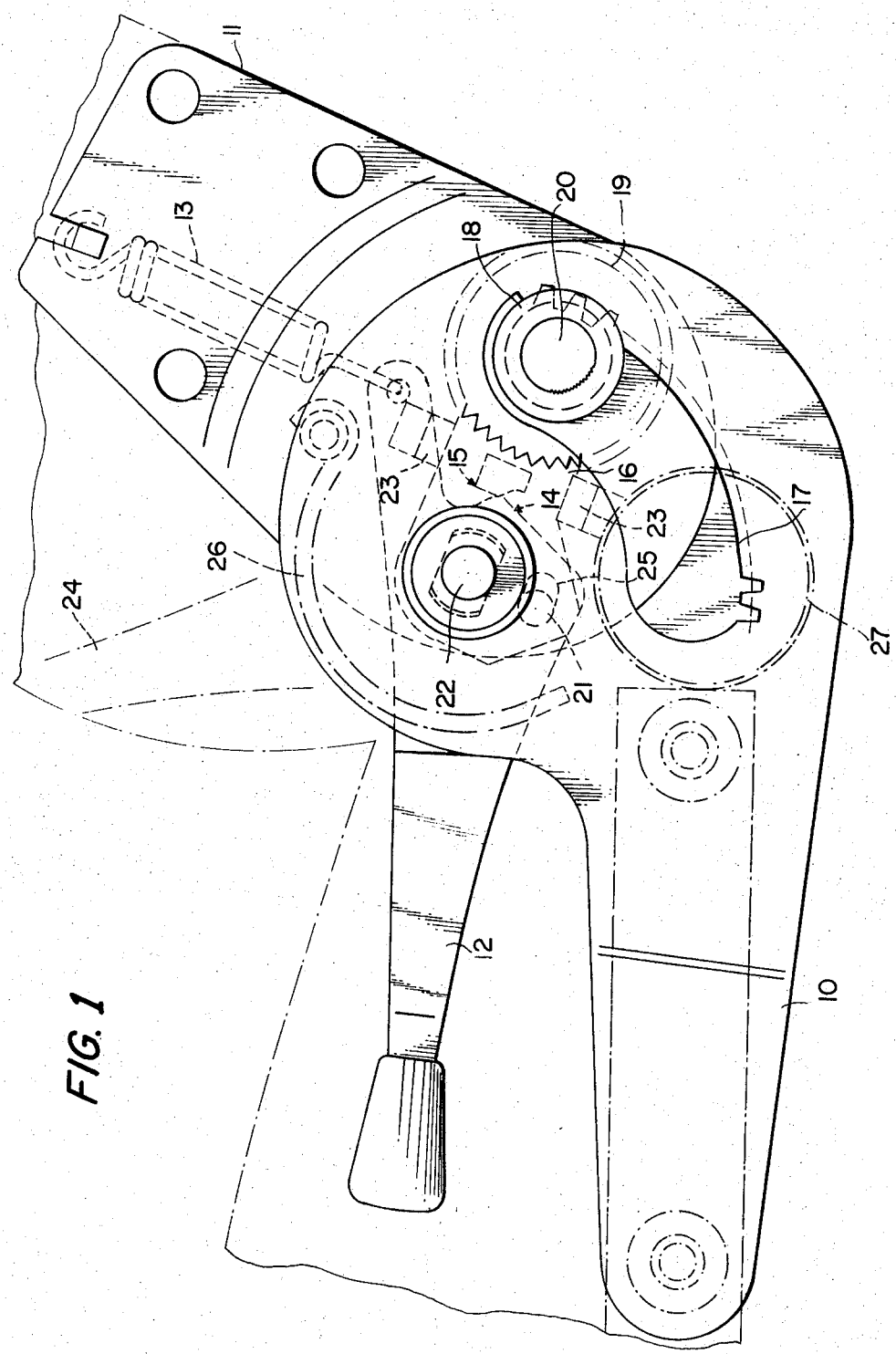
FIG. 1 is a side view of a first embodiment of a fitting according to the present invention.

Many of the support members, cover plates, trim portions, and other conventional structure of the present invention that are in common with well-known existing fittings for adjusting the inclination of back rests with respect to seat members for automotive seats have not been shown in the drawing for simplicity to more clearly show the inventive aspects of the present invention.

The side view of a typical automotive seat according to the first embodiment of the present invention as shown in FIG. 1 employs a first fitting member or plate 20 that is rigidly or fixedly secured to the generally horizontal seat member, and further shows a second fitting member or plate 11 that is similarly or fixedly connected to the generally vertical back rest of the automotive seat. The two plates 10 and 11 are pivotally interconnected by means of a shaft 22 which is preferably continuous across the entire width of the seat to correspondingly pivotally interconnect a second set of mirror image plates at the other side of the automotive seat.

Since the plates and tilting mechanism on either side of the seat are identical, preferably, only one side will be discussed in detail. A toothed arcuate segment 17 according to the FIG. 1 embodiment is formed on the plate 10, preferably by cutting out a portion of the plate 10 to form an arcuate recess having internal teeth on its outer arc as shown in the drawing, which arcuate array of teeth for the segment 17 are concentric with respect to the common shaft 22 that forms the pivotal axis. A correspondingly toothed spur gear wheel 18 is rotatably mounted on the other plate 11 to be in meshing toothed engagement with the toothed segment 17 throughout the entire adjustment range of the seat. The gear wheel 18 is drivingly interconnected by means of a common shaft 20 with the corresponding gear wheel on the other side of the seat, which shaft 20 extends parallel with the shaft 22 across the entire width of the seat.

Although the locking mechanism may be provided on both sides of the seat with interconnected operators for actuation from either side, the detailed description of the locking mechanism will be set forth with respect to only one side of the seat, which with respect to the driver seat will usually be the left hand side, with it being understood that the locking mechanism would be provided on the right hand side of the seat with right hand steering. The description of the locking mechanism for fixing the seat inclination or the relative pivotal position between the two plates 10, 11 will be described below. A peripherally toothed wheel 19, preferably of considerably larger diameter than the gear wheel 18 is rotatably mounted on the plate 11 and driven by the gear wheel 18, preferably being fixed to the common shaft 20. The shaft 20, the gear wheel 18 and the larger gear wheel 19 form a rigid single unit rotatably mounted on the fitting plate 11.

The common pivot shaft 22 that pivotally interconnects the plates 10 and 11 on both sides of the seat is surrounded, at the locking side, with a detent slide plate parallel and adjacent the plates 10, 11, and in the same plane as the larger gear wheel 19. The slidably mounted detent plate 16 is provided at its right hand side, with respect to FIG. 1, with an arcuate concave segment of teeth for meshing engagement with the corresponding teeth on the periphery of the gear wheel 19. Opposed bearing members 23 are fixedly mounted on the plate 11 for guiding the detent slide plate 16 for reciprocating movement toward and away from the gear wheel 19 along a path extending between the shafts 20 and 22, that is radial with respect to both the shafts 20 and 22. As shown in the drawing, the detent slide 16 is further provided with a slot that is elongated in the direction of reciprocation and surrounding the shaft 22 for further guiding the reciprocating movement of the detent slide 16 and limiting its movement away from the gear wheel 19. A projection from the slider detent 16 is provided with a cam surface 15 following cam engagement with a cam surface 14, as discussed further below.

On the side of the seat that is provided with the locking mechanism including the detent slide plate 16, there is also provided an actuating lever 12 that is rotatably mounted on the common shaft 22 to pivot between the solid line one extreme position shown in FIG. 1 and the dot dash line other extreme position 24. A helical tension spring 13 will bias the actuating lever counterclockwise about the common shaft 22. As shown, the actuating lever 12 is provided with a handle at one end and with the cam surface 14 at its opposite end, which in the full line illustrated locking position shown in FIG. 1 will cooperate with the cam surface 15 of the slide detent, so that the two cam surfaces 14, 15 will be in engagement to positively hold the teeth of the detent slide 16 into meshing engagement with the opposed teeth of the larger gear wheel 19 in the rest position of the lever 12 to which it has been biased by the spring 13 to thus positively lock the gear wheel 19 against rotation and correspondingly lock the two plates 10, 11 against rotation.

If it is desired to adjust the inclination of the back rest, the lever 12 will be grasped and pulled upward by hand, that is in the clockwise direction with respect to FIG. 1 about the pivotal axis 22 to its other extreme position shown at 24. During this movement, the two cam surfaces 14 and 15 will become disengaged and the detent slide 16 will be free to move upward and to the left along its reciprocating path toward the shaft 22 by means of a return spring (not shown) or by means of a pin 21 and a slot 25 connection between the detent slide 16 and actuating lever 12, so that the detent slide 16 and gear wheel 19 will become disengaged. Preferably, the pin 21 is rigidly mounted on the detent slide 16 and the slot 25 is formed within the generally plate like actuating lever 12. With a disengagement of the detent slide 16 and larger gear wheel 19, the gear wheel 18 will be free to rotate and correspondingly the plate 10 and plate 11 will be free to relatively pivot, so that the back rest to which the plate 11 is secured may be either pulled forward by a suitably connected torsion spring 26 or pushed backwards into a desired position by the weight of the person sitting on the seat. When the back rest has reached the desired or required inclination, the lever 12 may be released from its position 24 to return to its full line position under the bias of the spring 13 so that the plates 10 and 11 will be interlocked in this position by means of the detent slide 16 being driven into toothed engagement with the larger diameter gear wheel 19 by the cam surfaces 14, 15.

In FIG. 1, the position of the larger gear wheel 19, when the back rest and plate 11 have been moved fully clockwise to their extreme reclined position, has been shown in dot dash lines at 27.

Figure 2:
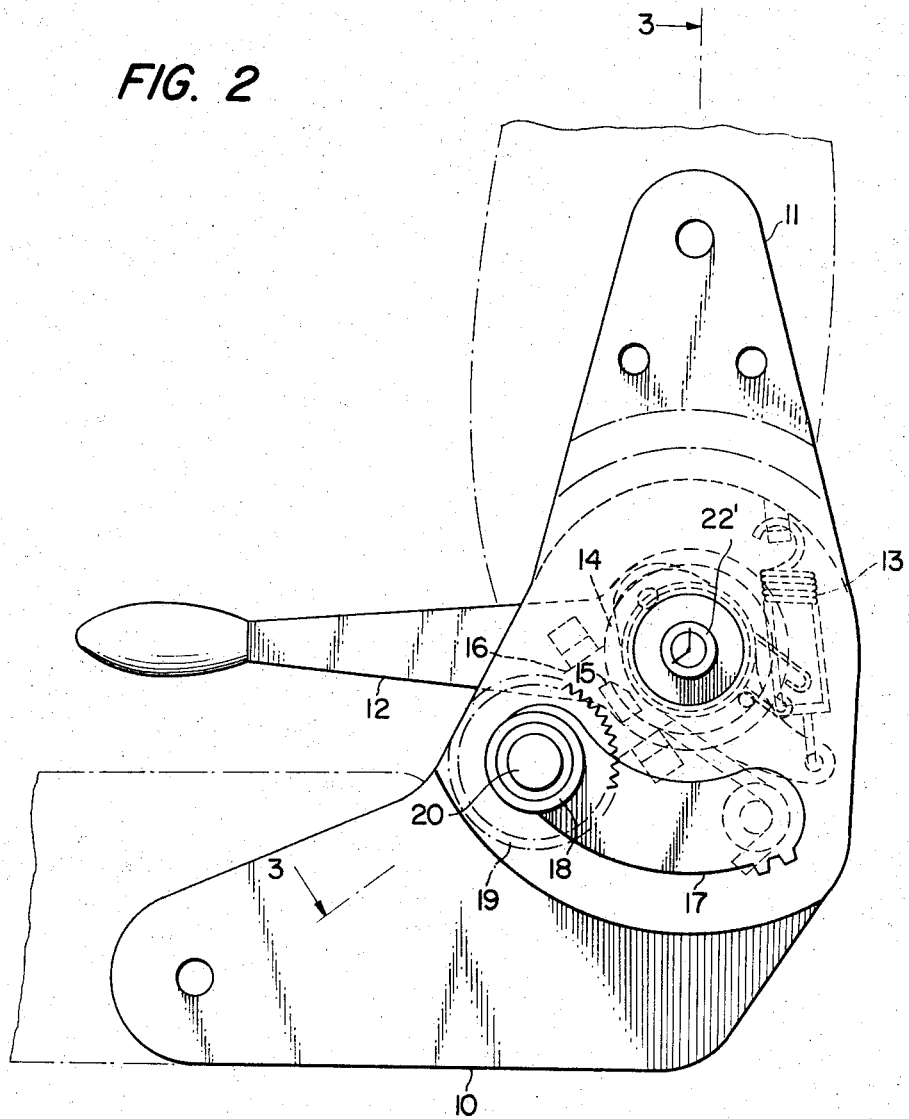
FIG. 2 is a side view similar to FIG. 1, but of a second embodiment of a fitting according to the present invention.

In FIG. 2, a second embodiment of the present invention has been shown, which will give the back seat passengers more leg room than in the embodiment of FIG. 1. In FIG. 2, structure corresponding to that of FIG. 1 has been provided with identical numerals and will have the same function as in FIG. 1, so that a full description is not necessary. The size of the fitting according to FIG. 2 is determined by the fact that the toothed segment 17 is located as shown, that is forward of its position in FIG. 1 and because the shaft 20 that connects the two gear wheels 18 on opposite sides of the seat may then correspondingly be moved forward. Further, since the toothed segment 17 is carried by the plate 11 instead of the plate 10 as in FIG. 1 and the gear wheel 18 of FIG. 2 is carried by the plate 10 instead of by the plate 11 as in FIG. 1, the shaft 20 will be in the forwardmost position of the slot having therein the two segments 17 when the back rest is in its upright position, which is in contrast to the embodiment of FIG. 1 wherein the shaft 20 is in its rearmost position when the back rest is in its upright position, all of which will contribute to increased leg room in the rear seat. The locking mechanism of FIG. 2 is reliable and generally functions in the manner previously described with FIG. 1, with the following additional description.

With respect to FIG. 2, the two plates 10 and 11 respectively connected with the generally horizontal seat member and generally vertical back rest are pivotally interconnected by the common shaft 22. The toothed segment 17 is carried by the plate 11 and the plate 10 carries the rotatably mounted gear wheels 18 that will mesh with the toothed segment 17. Beside the gear wheel 18 there is the larger gear wheel 19 fixedly connected with the smaller gear wheel 18 that is on both sides of the seat. The two gear wheels 18 and 19 may be mounted on a common shaft extending across the width of the seat or on stub axles which need be no longer than the overall width of the fitting. On both sides, that is on both plates 10 of the fittings, a detent slider 16 similar to that shown in FIG. 1 is located and the slides located on both sides are actuated by cam surfaces similar to what has already been described with respect to FIG. 1. It is important that the two cams actuating the slide detent 16 are rotatable about the shaft 22 and driven together when locking mechanisms are provided on both sides of the seat so that the detent slides on both sides of the seat will be actuated simultaneously, and it is necessary to provide only one actuating lever 12 at one side of the seat.

The actuation of the cams 14, 15 in the embodiment of FIG. 2 is similar to what has already been described with respect to FIG. 1.

In the fitting according to FIG. 2, no further shaft or axle must be located further to the right, that is further back than the position corresponding to the shaft 22, in the embodiment of FIG. 1. Due to the structure of the fitting shown in FIG. 2, the cutout in which the toothed segment edge is formed is located below the shaft 22' and it is not necessary for this cutout to be located at the bottom right hand of FIG. 2, since it would increase the size of the plates. The two plates 10 and 11 to the right of the shaft 22, and to the rear with respect to the direction of travel of the vehicle, are quite narrow, which makes such a construction of the fitting particularly suitable for two door passenger cars, since the fitting, which extends toward the entry to the back seats, does not project to any extent when the back rest or the whole seat is tilted forward as shown in full lines in FIG. 2.

Figure 3:
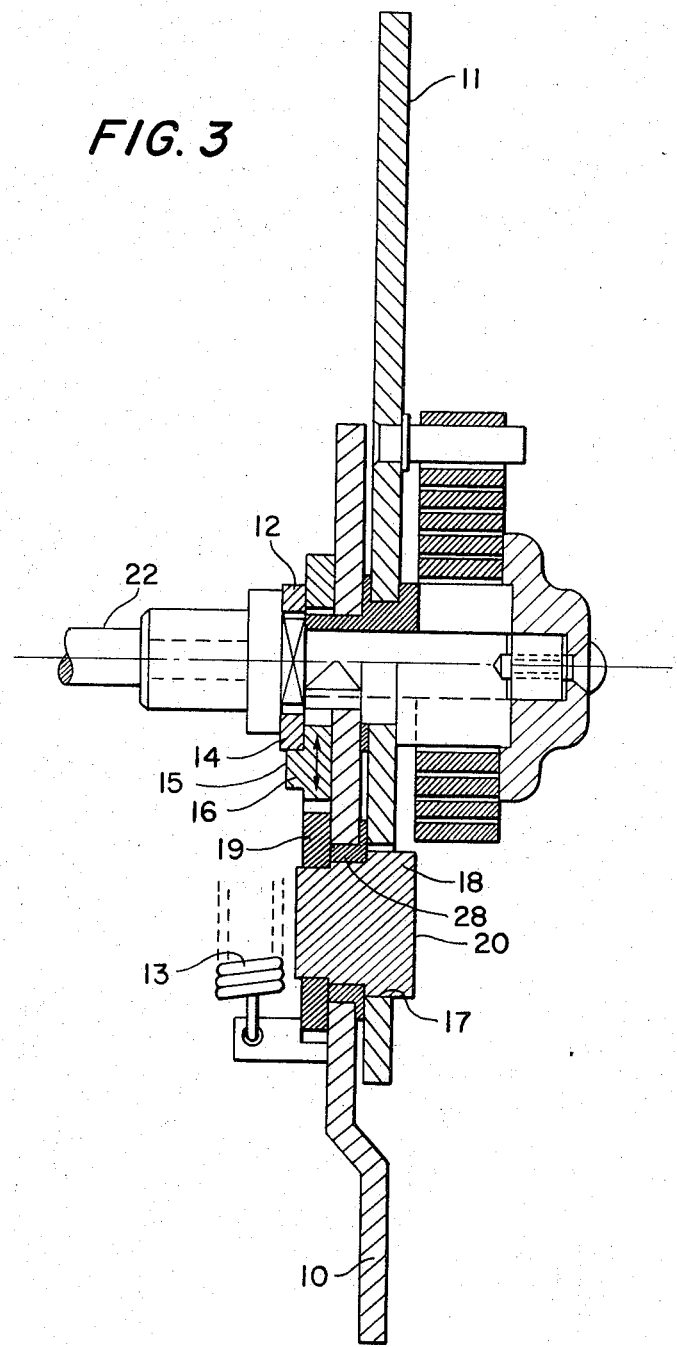
FIG. 3 is an end view, taken at right angles to the plane of FIGS. 1 and 2 and showing a third embodiment of the present invention.

While FIG. 3 may be considered as a separate embodiment of the present invention, it may also be considered as an end view of the mechanism shown in FIG. 2, with corresponding numerals being applied to corresponding parts. As shown, a particularly rigid interconnection between the smaller gear wheel 18 that meshes with the toothed segment 17 and the larger detent gear wheel 19 is provided. For rigidity of connection, the gear wheel 18 is provided with an axial dimension larger than is necessary for meshing engagement with the toothed segment 17 to provide a strong shoulder in axial engagement with a bearing bushing 28 that is in rotary bearing engagement with the fitting plate 10. The teeth of the gear 18 may be formed along the entire axial extent of the shaft and cut down in diameter at its central portion to form splines for interengaging with the correspondingly formed internal splines of the annular bearing bushing 28, and further cut down in diameter at the opposite axial end to form a force fit mounting for the larger diameter gear wheel 19. With such a construction, a particularly rigid connection between the large diameter gear wheel 19 and the smaller diameter gear wheel 18 is obtained with the integral one piece shaft. This feature is of particular importance with respect to the safety regulations applicable to modern passenger car seats that demand a rigid connection between the back rest and seat for a particular adjusted position. Although this object is obtained as shown, no increased expenditure is involved; the connection established between the gear wheels 18 and 19, in accordance with the embodiment of FIG. 3, is cheaper than welding the parts together.

While preferred embodiments of the present invention have been shown in detail for purposes of illustration, further embodiments, variations and modifications are contemplated according to the spirit and scope of the present invention as defined by the following claims.

What is claimed is:

1. A fitting for adjusting the pivotal relationship of an automotive seat back rest with respect to the seat member and for firmly locking the back rest into any desired angular position relative to the seat member within a predetermined range of settings, comprising: a first member rigidly connected to one of said back rest and seat member; a second member rigidly connected to the other of said back rest and seat member and further being pivotally connected with a common pivotal axis with said first member; a gear toothed segment fixed with respect to said first member and extending concentrically with respect to said pivotal axis; a first toothed gear wheel secured to a rotatable shaft rotatably mounted on said second member and being in toothed meshing engagement with said gear toothed segment; a second toothed gear wheel larger in diameter than said first toothed gear wheel and being rigidly secured to an axial extension of said rotatable shaft; and gear toothed detent means for selectively engaging and releasing the teeth on the periphery of said second toothed gear wheel to prevent rotation of said first and second toothed gear wheels as a unit relative to said first and second members with said detent in engagement with said second toothed gear wheel; and operator control means for controlling selective engagement with release of said detent means to thereby allow adjustment of the back rest relative to the seat member.

2. The fitting of claim 1, wherein said detent means is mounted for linear reciprocating movement toward and away from said second toothed gear wheel for respective engagement and release with the direction of reciprocation being radial with respect to said pivotal axis.

3. The fitting of claim 1, wherein said detent means is a plate having a gear tooth edge for reciprocal movement into meshing engagement with the second toothed gear wheel and a slot elongated in the direction of reciprocation; and a shaft pivotally interconnecting said first and second members about said pivotal axis and passing through said elongated slot in said detent plate to provide with said slot guides for the movement of said detent plate between its engaged and released positions.

4. The fitting according to claim 3, wherein said operator control means comprises an actuating lever mounted for pivotal movement about said pivotal axis between a first locking position and a second releasing position; said actuating lever further having a cam surface at one end for engaging a cam follower surface on said detent plate to positively retain said detent plate in locking engagement with said second toothed wheel in the first pivotal position of said actuating lever.

5. A fitting according to claim 1, wherein said operator control means comprises an actuating lever mounted for pivotal movement about said pivotal axis between a first locking position and a second releasing position; said actuating lever further having a cam surface at one end for engaging a cam follower surface on said detent means to positively retain said detent means in locking engagement with said second toothed gear wheel in the first pivotal position of said actuating lever.

6. The fitting according to claim 4, including a pin and slot connection between said actuating lever and said detent plate for positively driving said detent plate away from said second toothed gear wheel upon movement of said actuating lever from its first pivotal position to its second pivotal position, and first spring means normally biasing said actuating lever into the first pivotal position.

7. A fitting according to claim 6, including a pin and slot connection between said actuating lever and said detent means for positively driving said detent means away from said second toothed gear wheel in the movement of said actuating level from its first pivotal position to its second pivotal position, and first spring means normally biasing said actuating lever into the first pivotal position.

8. The fitting according to claim 6, wherein said first and second members, said first and second toothed gear wheels, said actuating lever, and said detent plate with said coacting arcuate toothed segment are all mounted on one side of the back rest and seat member; a second set of first and second members correspondingly mounted rigidly on said back rest and seat member at the other side of said back rest and seat members and further including a corresponding toothed segment, first and second toothed gear wheels, pivotal axis and pivotal shaft for said second set of first and second members; and second spring means acting between said first and second members for normally biasing the back rest into an upright position relative to the seat member with the detent plate released, said second spring means being designed to be overcome by the weight of an occupant with the detent plate released whereby the back rest can be adjusted to a desired angle of inclination.

9. The fitting according to claim 8, wherein one of said toothed gear wheels is integrally formed in one piece with a stub shaft having splines; an annular bearing member rigidly mounted on said splines and being in bearing engagement at its outer peripheral surface with said second member; the outermost portion of said spline shaft on the opposite side of said bearing from said one toothed gear wheel having a smaller outer spline diameter than the portion of the spline shaft in engagement with said bearing, and being splined with substantially the same root diameter as the remainder of said shaft; and the other of said toothed gear wheels being pressed onto said reduced diameter outermost spline portion of said shaft stub shaft to form a unitary rigid structure.

10. The fitting according to claim 1, wherein one of said toothed gear wheels is integrally formed in one piece with a stub shaft having splines; an annular bearing member rigidly mounted on said splines and being in bearing engagement at its outer peripheral surface with said second member; the outermost portion of said spline shaft on the opposite side of said bearing from said one toothed gear wheel having a smaller outer spline diameter than the portion of the spline shaft in engagement with said bearing, and being splined with substantially the same root diameter as the remainder of said shaft, and the other of said toothed gear wheels being pressed onto said reduced diameter outermost spline portion of said shaft stub shaft to form a unitary rigid structure.

* * * * *